Nov. 26, 1935.    G. F. TAYLOR    2,022,528
APPARATUS FOR SINTERING REFRACTORY MATERIAL
Filed March 17, 1934

Inventor:
George F. Taylor,
by Harry E. Dunham
His Attorney.

Patented Nov. 26, 1935

2,022,528

UNITED STATES PATENT OFFICE 2,022,528

APPARATUS FOR SINTERING REFRACTORY MATERIAL

George F. Taylor, Schenectady, N. Y., assignor to General Electric Company, a corporation of New York Application March 17, 1934, Serial No. 716,108

4 Claims. (Cl. 13—22)

The present invention relates to an apparatus for sintering refractory materials and more particularly to a mold adapted for use in manufacturing cemented carbides by the simultaneous application of heat and pressure to the finely divided constituents of such carbides.

Heretofore in the manufacture of cemented carbides by the simultaneous application of heat and pressure it has been customary to employ relatively large carbon molds having a central bore within which the material to be pressed and sintered is positioned. The carbon molds employed in such processes and the charges therein are heated to relatively high temperatures, for example, temperatures in the neighborhood of 1200 to 1500° C. A pressure of about 1000 lbs. or more per square inch is applied to the charge in the mold. Under such circumstances there is a tendency for the molds to break even when moderate pressures are employed. The large carbon molds heretofore employed have further defects. For example, the heat distribution in such molds is not always uniform and as a result one part of the charge within the mold may be heated to the proper temperature while other portions of the charge may be heated to temperatures which are either excessive or insufficient. Furthermore the use of large carbon molds is not economical due to the fact that the current required to heat a charge within a large carbon mold is very heavy and the mold must be discarded after one sintering operation.

One of the objects of the present invention is to provide an improved mold for sintering refractory material. A further object of the invention is to provide a mold which is strong and relatively cheap, because it can be used over and over again, and which provides a substantially uniform distribution of heat in the material to be sintered in the mold.

Figure 1:
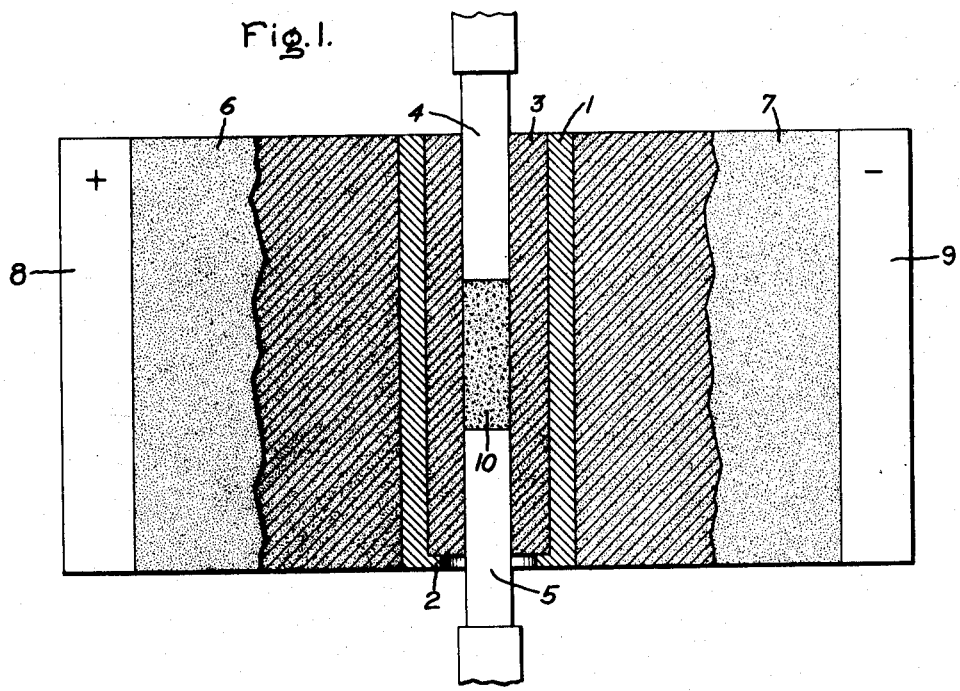
Figure 2:
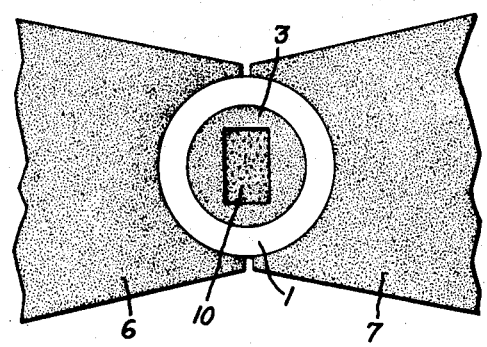

The novel features which are characteristic of my invention are set forth with particularity in the appended claims. The invention itself however will best be understood from reference to the following specification when considered in connection with the accompanying drawing in which Fig. 1 is a view partly in section and partly in elevation of my improved mold, and means for supplying an electric current thereto, while Fig. 2 is a horizontal cross-sectional view partly broken away of the apparatus disclosed in Fig. 1.

Referring more particularly to the drawing, I have indicated at 1 a relatively heavy, hollow metal tube or cylinder having an inturned ledge 2 at the lower end thereof and made of a high melting point metal such as tungsten or molybdenum preferably the latter. Within the tube 1 and resting on the shoulder 2 a hollow carbon tube 3 is positioned. The opening through the carbon tube 3, while indicated on the drawing as rectangular in cross section, obviously may have any shape desired. The material to be simultaneously compressed and sintered is placed within the carbon tube 3 and between plungers 4 and 5 as indicated in Fig. 1. The assembled mold is then positioned between carbon blocks 6 and 7 and clamped between water cooled electrodes 8 and 9 connected to a suitable source of electric power not shown. When sufficient heat is generated by an electric circuit completed through the electrodes, carbon blocks and metal tube 1, pressure is applied to the material in the mold by the plungers 4 and 5 to thereby compress it into a hard, dense mass. The molybdenum tube 1 is heated to a high temperature by the electric current flowing therethrough. Since molybdenum is a good heat conductor tube 1 is heated uniformly and acts as a heat reservoir thereby providing an even distribution of heat to the carbon tube 3 and the charge 10 therein. The tube 1, even when heated to temperatures in the neighborhood of 1400° C., is very strong thereby permitting the application of high pressures to the charge 10 without adversely affecting the mold. The employment of high pressures results in the production of high density material substantially free from cavities.

By employing my improved mold in sintering powdered metals and the like a considerable saving in carbon as well as in the current consumed may be effected. As in the prior art devices, the carbon in the mold is discarded after each sintering operation. In the present case however the cylinder 3 contains only a small amount of carbon and its loss is immaterial. Furthermore, since my improved mold is relatively small as compared with the large carbon molds of the prior art, only a small quantity of current is required to heat the tubes 1 and 3 and the charge therein to the desired sintering temperature.

What I claim as new and desire to secure by Letters Patent of the United States is:

1. A mold comprising a hollow metal tube, a hollow refractory heat conducting cylinder supported within and in contact with said tube, means for supporting material within said cylinder and means including said tube for heating said material to an elevated temperature.

2. A mold comprising a hollow metal tube, a hollow refractory heat conducting cylinder supported within and in contact with said tube, means for supporting powdered material within said tube, and means whereby an electric circuit may be completed through said tube to thereby heat said powdered material to its sintering temperature.

3. A mold comprising a hollow, molybdenum tube, a hollow carbon cylinder supported within and in contact with said tube, means for supporting material within said cylinder, and means including said tube for heating said material to its sintering temperature.

4. A mold comprising a hollow, molybdenum tube, a hollow carbon cylinder supported within and in contact with said tube, means for supporting material within said cylinder, and means for completing an electric circuit through said tube to thereby heat said material to its sintering temperature.

GEORGE F. TAYLOR.